United States Patent [19]
Arriola et al.

[11] Patent Number: 5,996,514
[45] Date of Patent: Dec. 7, 1999

[54] APPARATUS AND METHOD FOR SUBSURFACE APPLICATION

[76] Inventors: James M. Arriola; D. Martin Arriola, both of 838 Sunkist, Moses Lake, Wash. 98837

[21] Appl. No.: 08/924,375

[22] Filed: Sep. 5, 1997

Related U.S. Application Data

[63] Continuation of application No. 08/393,862, Feb. 24, 1995, abandoned.

[51] Int. Cl.$^6$ ................................................. A01C 23/00
[52] U.S. Cl. ........................... 111/124; 111/150; 111/152; 172/724
[58] Field of Search ................... 111/124, 113, 111/123, 125, 119, 152, 150; 172/724

[56] References Cited

U.S. PATENT DOCUMENTS

| | | | |
|---|---|---|---|
| 1,564,083 | 12/1925 | Lyons | 111/152 X |
| 2,285,932 | 6/1942 | Leavitt | 111/119 X |
| 2,357,141 | 8/1944 | Singleton | 111/129 X |
| 2,646,012 | 7/1953 | Ingalls | 111/124 |
| 2,722,902 | 11/1955 | Hyatt | 111/124 |
| 2,802,435 | 8/1957 | Maxwell | 111/124 |
| 2,849,970 | 9/1958 | Coberly et al. | 111/119 |
| 2,881,848 | 4/1959 | Liston | 172/555 |
| 3,185,117 | 5/1965 | Frantzen | 111/124 |
| 3,188,989 | 6/1965 | Johnston | 111/150 X |
| 3,608,645 | 9/1971 | Meiners | 172/491 |
| 3,863,842 | 2/1975 | McFarland et al. | 111/124 X |
| 3,874,593 | 4/1975 | Wilt | 239/166 |
| 4,079,680 | 3/1978 | Davis | 111/124 |
| 4,116,139 | 9/1978 | Sauer | 111/150 X |
| 4,129,082 | 12/1978 | Betulius | 172/724 X |
| 4,211,175 | 7/1980 | Van der Lely | 111/127 |
| 4,373,455 | 2/1983 | Friggstad | 111/150 |
| 4,565,141 | 1/1986 | Kopecky | 111/124 |
| 4,638,748 | 1/1987 | Kopecky | 111/124 |
| 4,683,826 | 8/1987 | Solie et al. | 111/124 |
| 4,773,340 | 9/1988 | Williams et al. | 111/124 |
| 5,033,398 | 7/1991 | Froc | 111/124 X |
| 5,136,954 | 8/1992 | Fetaz et al. | 111/124 X |

FOREIGN PATENT DOCUMENTS

| | | | |
|---|---|---|---|
| 530673 | 9/1956 | Canada | 111/124 |
| 1291054 | 2/1987 | U.S.S.R. | 111/124 |
| 1329652 | 8/1987 | U.S.S.R. | 111/124 |
| 1544233 | 2/1990 | U.S.S.R. | 111/124 |
| 556906 | 10/1943 | United Kingdom | 111/124 |
| 891031 | 3/1962 | United Kingdom | 111/124 |

OTHER PUBLICATIONS

"TeeJet® Agricultural Spray Products Catalog #43," Spraying Systems Co., pp. 22–23.

*Primary Examiner*—Victor Batson
*Attorney, Agent, or Firm*—Stratton Ballew PLLC

[57] ABSTRACT

The invention comprises an apparatus for the subsurface application of chemicals such as metham sodium in soil. A frame is shown, capable of being pulled across a field, the frame having a plurality of shanks with a plate and a rearwardly discharging wide angle flat spray nozzle mounted at the end of each shank. The plates all lie in a single plane, substantially horizontal to the soil's surface. Structure is provided for delivering the chemical from a reservoir to the nozzles. The chemical is thereby applied in a single pass at a depth of up to 12 inches, and allowed to migrate upward in the soil, thereby achieving application of the chemical in a discrete layer of the soil, without unduly disturbing the soil's surface.

1 Claim, 6 Drawing Sheets

APPARATUS AND METHOD FOR SUBSURFACE APPLICATION

CROSS REFERENCE TO RELATED APPLICATIONS

This application is a continuation of U.S. patent application Ser. No. 08/393,862, filed Feb. 24, 1995, now abandoned.

BACKGROUND OF THE INVENTION

1. Field of the Invention

The present invention relates to the field of agricultural implements for the preparation of soil for planting. More particularly, the invention pertains to a class of implements for delivering a substance or chemical into a discrete subsurface layer of the soil.

2. Description of the Prior Art

There are numerous references to agricultural implements for applying fertilizer, pesticides and fumigants to soil and crops.

A Spray Support Frame is shown in U.S. Pat. No. 3,874,593 issued to Wilt. The support frame has a plurality of arms mounted laterally thereon, the arms each having a generally downward facing nozzle affixed at its lower end for spraying the surface of the soil. The support frame may also carry soil cultivating and planting elements and suitable shoes or shovels for opening a fertilizer trench. No provision is made in the apparatus of Wilt for subsurface application.

U.S. Pat. No. 2,357,141 to Singleton discloses a Poison or Fertilizer Distributing Machine. In one version, a fertilizer distributing head is mounted laterally on a frame. The head contains a plurality of downward facing nozzles for delivering a fertilizer spray to the surface of the soil. Mounted rearwardly of the distributing heads is a plurality of cultivator shovels. Chemical application in Singleton is achieved by surface spraying followed by soil mixing, requiring the soil surface to be broken.

U.S. Pat. No. 2,881,848 to Liston for a Soil Treatment Applicator discloses an applicator for first applying ribbon-like bands of chemicals to the ground surface and then breaking up and submerging the chemically treated surface soil thereby intimately intermixing the chemically impregnated soil with the remainder of the top soil. As in Singleton, chemical application is achieved by surface application followed by soil mixing, no provision being made for direct subsurface application.

In U.S. Pat. No. 4,211,175 to Van der Lely an agricultural implement with soil penetrating tools and liquid spray booms is disclosed. The apparatus includes a set of sickle-shaped tines laterally disposed on a frame. Mounted behind the tines is a spray boom having a plurality of generally downward and rearward facing spray nozzles. The nozzles are laterally spaced so as to deliver a spray midway between the points where adjacent tines engaged the soil. Mounted to the rear of the spray nozzles are a pair of laterally extending rollers which act as cultivating members. Again, chemical application is through soil surface spraying, although the soil is first broken, and then sprayed, followed by a cultivating step.

U.S. Pat. No. 3,608,645 to Meiners for a Farm Trailer With Balancing Means recites "[a] bladed implement for dispensing the liquid fertilizer into the ground . . . ". The drawings in Meiners generally show a pair of blades or shovels having tubes attached to the aft faces thereof, the tubes leading from a chemical tank. Meiners does not further disclose details concerning the construction of this bladed instrument, nor the apparatus for injecting the fertilizer.

U.S. Pat. No. 4,683,826 to Solie et al. discloses a method of subsurface application of chemicals. The method includes the steps of: i) forcing a horizontally elongated implement through the soil at a depth sufficient to break up the subsurface of the soil without disturbing the surface; and ii) injecting chemicals in a jet substantially upward into the soil. The elongated implement is composed of a pair of trailing sweep wings angled to each other, and forming a pointed apex at the fore portion thereof. The sweep wings include a downwardly inclined plate-like element for disturbing a layer of soil under the surface. A manifold is laterally mounted to the wings, the manifold having a plurality of upwardly facing nozzles, evenly spaced from one another, for injecting a pressurized jet of chemical upward into the disturbed soil. The apparatus of the Solie patent can work at a depth of up to 8 centimeters.

Subsurface application of fumigants, pesticides and fertilizer is highly desirable. Subsurface application reduces the amount of the chemical that is lost through runoff and dissipation in the air. This means less of the chemical must be applied in the first place, which results not only in lower costs for application, but also provides environmental benefits. This is a significant factor in light of the public's concern for protection of water supplies and the farmer's need to continue production under an ever increasing regulatory scheme. Additionally, subsurface application goes to the root of the matter, so to speak, applying fertilizer and fumigants directly where they are need.

Proper subsurface application should take place 5 to 12 inches below the soil's surface. This has proven to be a problem until now, since it was believed that at least two levels of plates would be required to apply the chemical in a discrete layer at the proper depth. The additional layer of plates essentially doubled the drag, creating very large forces on all the parts of the applicator as well as the tractor used to pull the applicator. This made effective subsurface application virtually impossible.

It has long been believed that fumigants and the like only percolate downward into the soil. This required upward facing nozzles to properly distribute the chemical. Upward facing nozzles have presented a problem in the past, often becoming clogged.

Additionally, subsurface applicators have used a manifold having a relatively large number of nozzles. This increases manufacturing costs and complicates repair and maintenance. A simplified applicator structure is desirable to overcome these problems.

SUMMARY OF THE INVENTION

The applicant's discovery that chemicals such as the fumigant metham sodium migrate a significant distance upward in the soil has permitted the applicant to invent a subsurface applicator which solves the above described problems.

The invention comprises a frame, capable of being pulled across a field, the frame having a plurality of arms or shanks mounted thereon extending downward from the frame into the soil, a plate mounted on the distal end of each shank for being forced through a discrete subsurface layer of the soil as the frame is advanced along the soil surface, and a fluid delivery system mounted to the frame including a nozzle proximate each plate having an opening pointing substantially rearward into the soil for delivering a substance into a discrete subsurface layer of the soil.

The plates all lie in a single plane. This is possible since the chemical may be applied at a single depth and be expected to migrate a significant distance upward in the soil. By only forcing a single set of plates through the soil, the resistance or drag is reduced which in turn allows the plates to be located much deeper in the soil than in any previous devices. As an example, previous devices could apply chemicals to a depth of 8 centimeters, versus 8 to 12 inches for the applicant's invention.

The same reasoning permits the use of downward facing nozzles, which are less likely to be clogged.

A single downward facing nozzle may effectively apply a chemical spray over the upper surface of a plate, thereby eliminating the need for a manifold having multiple nozzles. This simplifies the structure permitting a reduction in manufacturing costs, as well as ease of maintenance and repair.

DESCRIPTION OF THE PREFERRED EMBODIMENTS

Figure 1:
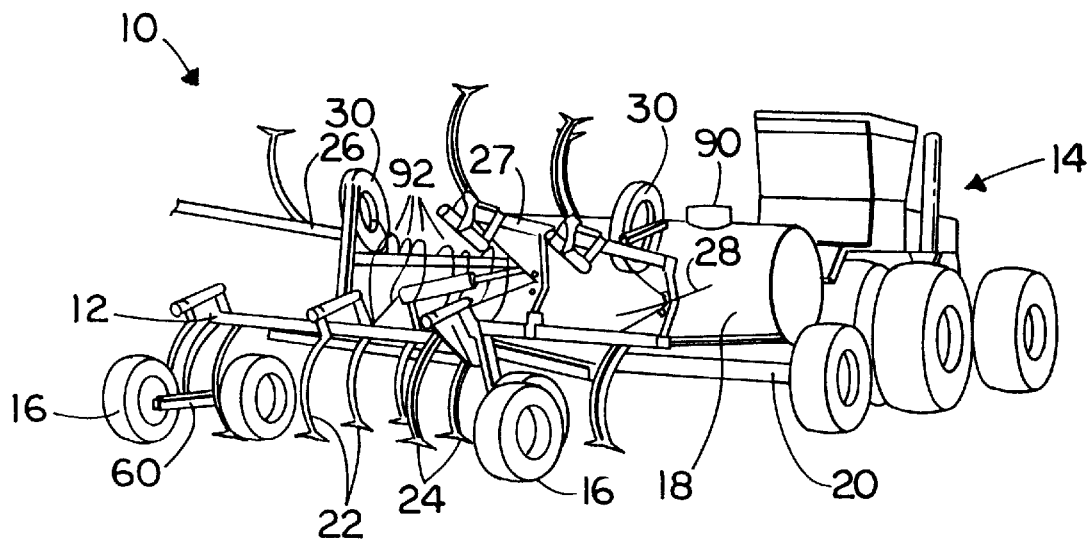
FIG. 1 is a perspective view of a preferred embodiment of the apparatus being pulled by a tractor.

With reference to FIG. 1, the apparatus 10 comprises a first frame 12, capable of being towed across a field by a tractor 14 or the like. The first frame 12 is mounted on a set of laterally spaced wheels 16 and may be connected to the tractor 14 by conventional hitch means (not shown). While a chemical storage tank or reservoir 18 may be attached directly onto the first frame 12, it is preferably carried on a second frame 20 which is connected between the tractor 14 and the first frame 12 by conventional hitch means (not shown).

A plurality of arms or shanks 22 are mounted on the first frame 12. A plate 24 is mounted on the distal end of each shank 22 for being forced through a discrete subsurface layer of the soil as the apparatus 10 is advanced over the soil surface. The shanks 22 are mounted in several rows, each row extending laterally across the first frame 12. Each shank 22 is mounted proximate one of its ends to the first frame 12. Adjacent shanks 22 are nominally spaced from one another a distance substantially equal to the width of the plates 24. This permits complete displacement of the soil in the subsurface layer, creating a cavity or tunnel (not shown) below the plate and approximately the width of the plate into which the chemical from the nozzle is deposited.

The first frame 12 may have a pair of outrigger frames 26,27 pivotally attached to the respective outside edges of thereof, the pivot axes 28 substantially parallel to the direction of travel of the apparatus 10. The outrigger frames 26,27 carry shanks 22 and plates 24 thereon, and are provided for varying the width of the row that will be treated in a single pass of the apparatus. The outrigger frames 26,27 may be pivoted between a retracted position in which the shanks 22 associated with the respective outrigger frames 26,27 are disposed relatively above the first frame 12 and an deployed position in which the shanks 22 are disposed relatively below the first frame 12, that is between the first frame 12 and the soil. Each outrigger frame 26,27 is independently pivotable, whereby the apparatus 10 may be set up to treat any one of three different row widths. Outrigger wheels 30 may be provided on the outrigger frames 26,27 for providing support thereto when the respective outrigger frame 26,27 is in the engaged position.

Figure 2:
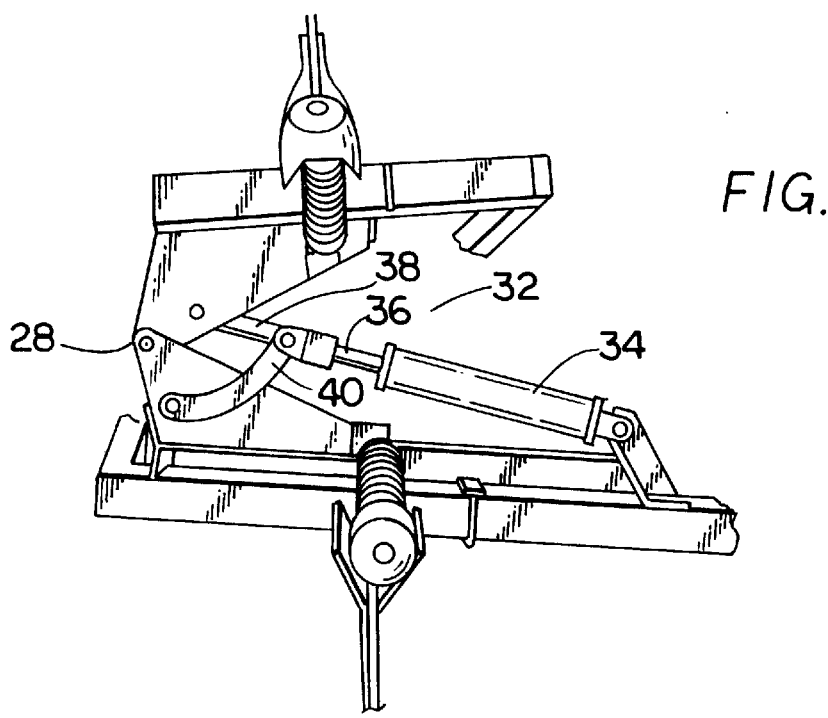
FIG. 2 is a view of the structure used to deploy and retract the outrigger frames of the preferred embodiment.

With reference to FIG. 2, outrigger hydraulic actuators 32 are used to pivot the respective outrigger frames 26,27 between the retracted and deployed positions. The outrigger hydraulic actuators each have an outrigger cylinder 34 and an outrigger piston 36. The outrigger cylinder 34 is pivotally mounted to a portion of the first frame 12 such that it lies in a plane substantially perpendicular to the pivot axis 28 of the respective outrigger frame 26,27 and the first frame 12. A straight arm 38 connects the free end of the outrigger piston 36 to the respective outrigger frame 26,27, the connection being spaced from the outrigger frame's 26,27 pivot axis 28 with the first frame 12. A curved arm 40 has a first end pivotally connected to the first frame 12 and a second end pivotally connected to the straight arm 38 between the ends of the straight arm 38. Conventional means for driving the outrigger hydraulic actuator (not shown) are provided on the first frame 12.

Figure 3:
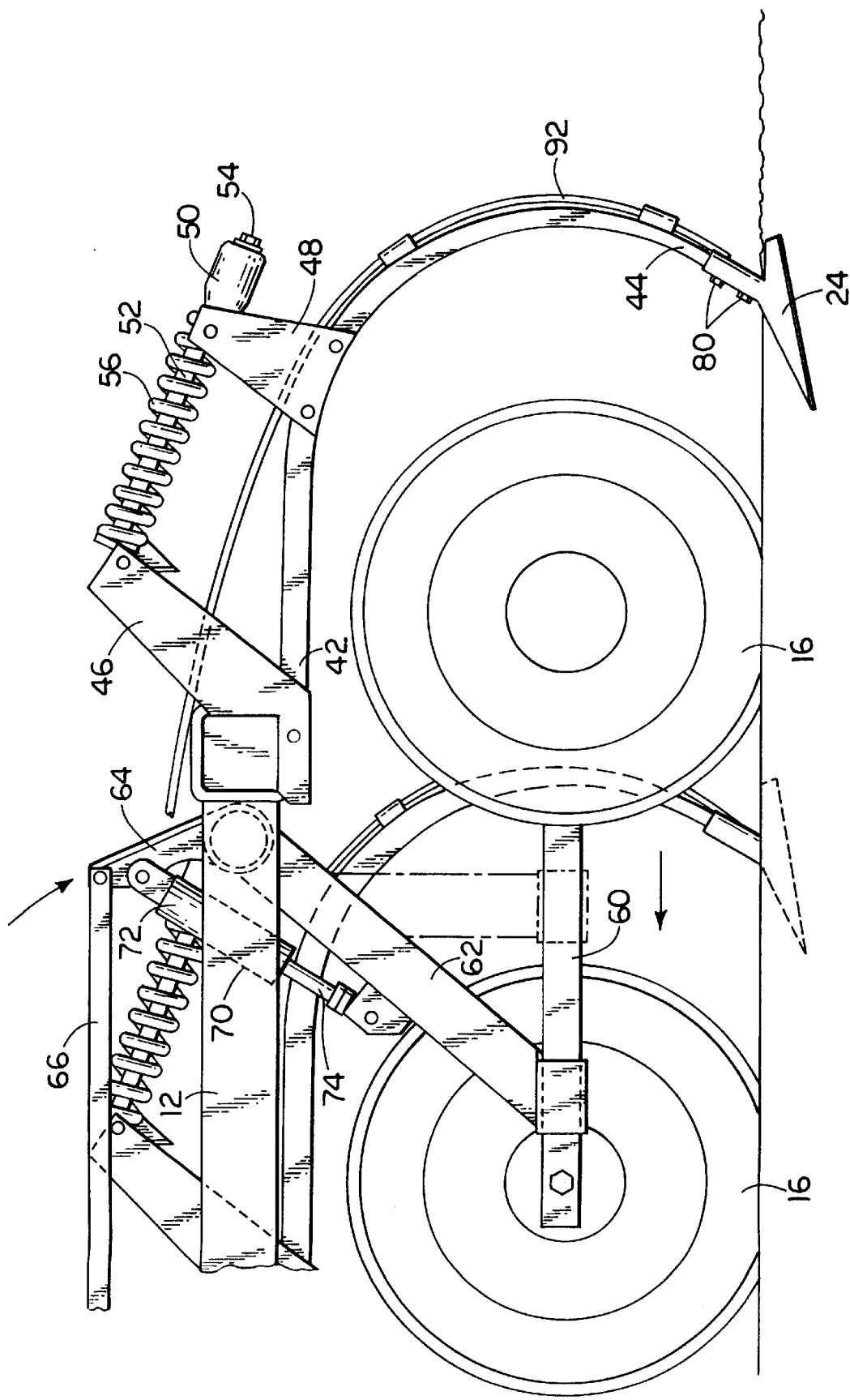
FIG. 3 is a side plan view of a portion of the preferred embodiment specifically showing the shanks and the height adjusting structure.

In the preferred embodiment, with reference to FIG. 3, a plurality of substantially J-shaped arms or shanks 22 having a first end 42 and a second end 44 are mounted on the first frame 12. The shanks 22 are preferably made of a spring steel to provide some resiliency for reducing fatigue and consequent failure upon the repeated striking of objects in the soil. The shanks 22 are preferably approximately 30 inches long. Suitable shanks 22 may be obtained from John Deere® who sells such as standard 30 inch shanks 22.

In the preferred embodiment, the shanks 22 are mounted proximate a first end 42 thereof to the first frame 12. A second, resilient mounting is provided between the shank 22 and the first frame 12. This includes a mounting flange 46 fixed to the first frame 12. A pair of opposed shank flanges 48 are fixed to the shank 22 proximate the point between the upper, straight portion of the J-shaped shank 22 and the lower, curved portion thereof. A saddle 50, having a central bore (not shown) therein is pivotally mounted between the shank flanges 48. A pin 52 has a first end pivotally mounted to the mounting flange 46 and a second end slideably received through the bore of the saddle 50. Preferably the second end has means thereon, such as a bolt 54, to prevent the pin 52 from pulling out of the bore. A coil spring 56 is received about the pin 52 between the mounting flange 46 and the saddle 50 for dampening vibrations in the shank 22 which result from the shank 22 or plates 24 striking buried objects. This noticeably increases the operative life of the shank 22. Preferably, the outside diameter of the coil spring 56 is such, that the coil spring 56 is supportingly received within the saddle 50.

The shanks 22 are pivotable between a disengaged position in which the plates 24 associated with the respective shanks 22 are above or on the surface of the soil and an engaged position in which the plates 24 are located in a discrete planar layer of soil defined under the surface of the soil.

In the preferred embodiment, a pair of height adjusting structures, one on each side of the first frame 12, are provided for moving the plates 24 between the disengaged and the engaged positions. The height adjusting structure will be explained with reference to FIG. 3. Each structure includes a pair of wheels 16 rotatably mounted proximate each end of a walking bar 60. An upwardly extending connecting arm 62 is pivotally mounted at one end thereof to the walking bar 60 and at the other end thereof to the first frame 12. A pivot flange 64 is pivotally mounted to the first frame 12 about the same pivot axis as the connecting arm 62. A retaining arm 66 extends between the pivot flange 64 and the first frame 12 to retain the pivot flange 64 in position relative to the first frame 12. A height adjusting hydraulic actuator 70 is provided comprising a height adjusting cylinder 72 and a height adjusting piston 74. The height adjusting cylinder 72 is pivotally mounted to the pivot flange 64, the free end of the height adjusting piston 74 being pivotally mounted to the connecting arm 62 between the connecting arm's connections to the walking bar 60 and the first frame 12. The height adjusting actuator 70 thus forms one leg of a triangle. The distance between the first frame 12 and the wheels 16 may thereby be adjusted by using the height adjusting actuator 70, which in turn moves the plates 24 between the disengaged and the engaged positions. Conventional means for driving the height adjusting actuator (not shown) are mounted on the first frame 12.

Figure 4:
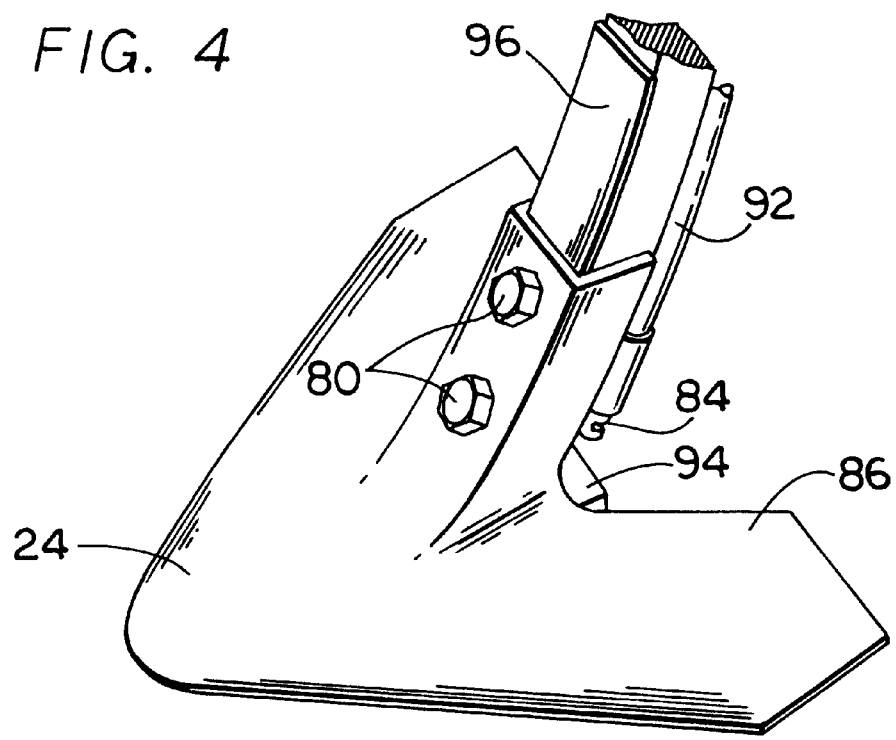
FIG. 4 is a perspective view of the front of the plate and shank.
Figure 5:
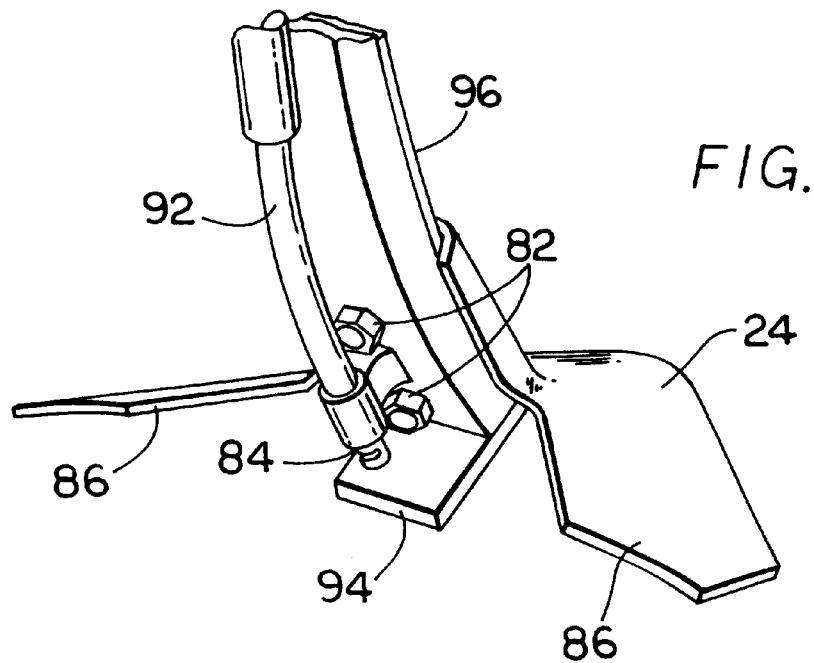
FIG. 5 is a perspective view of the rear of the plate and shank.
Figure 4A:
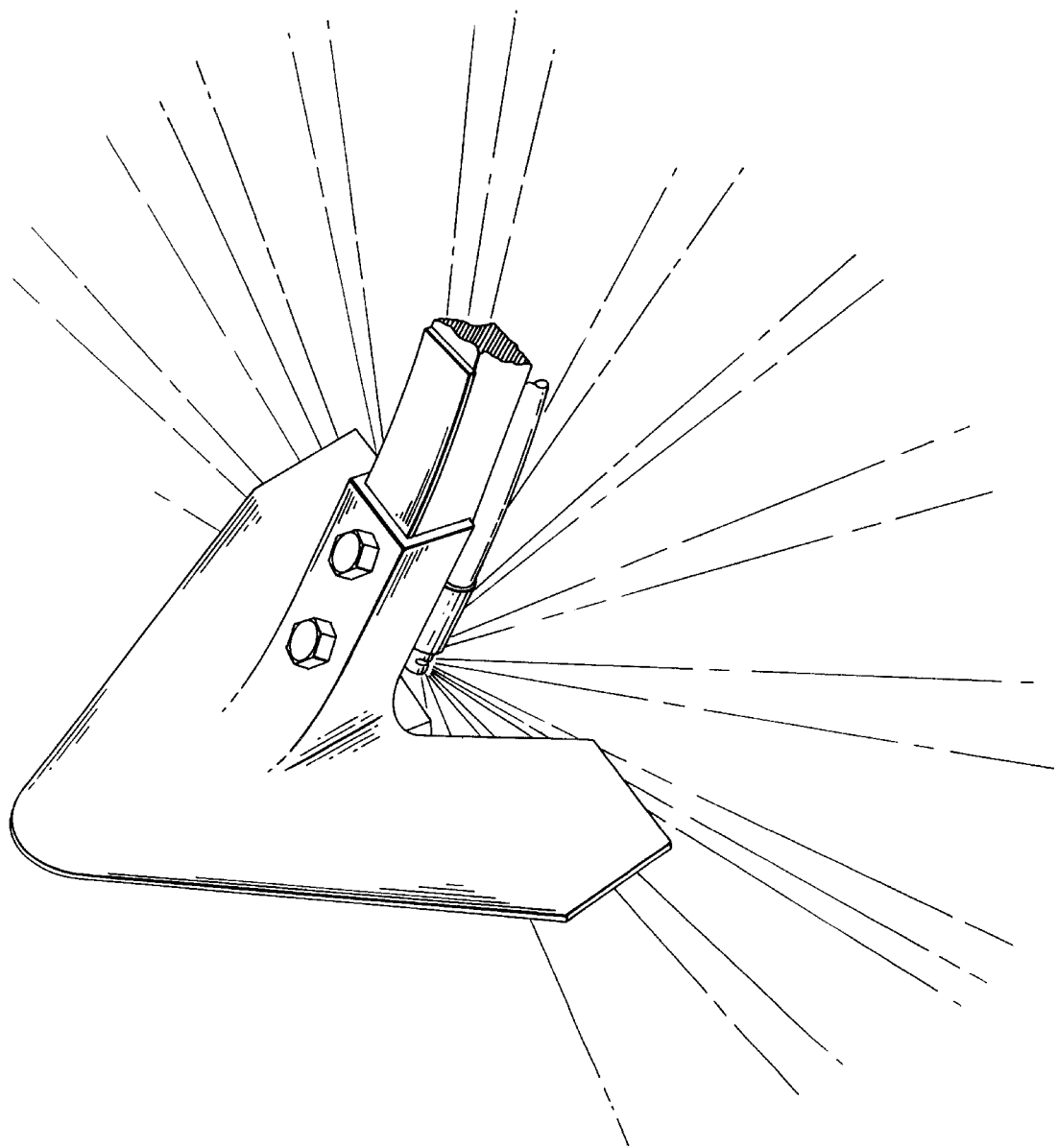
FIG. 4a is a perspective view of the front of the plate and shank and the rearwardly discharging spray pattern from the wide angle flat spray nozzle.
Figure 5A:
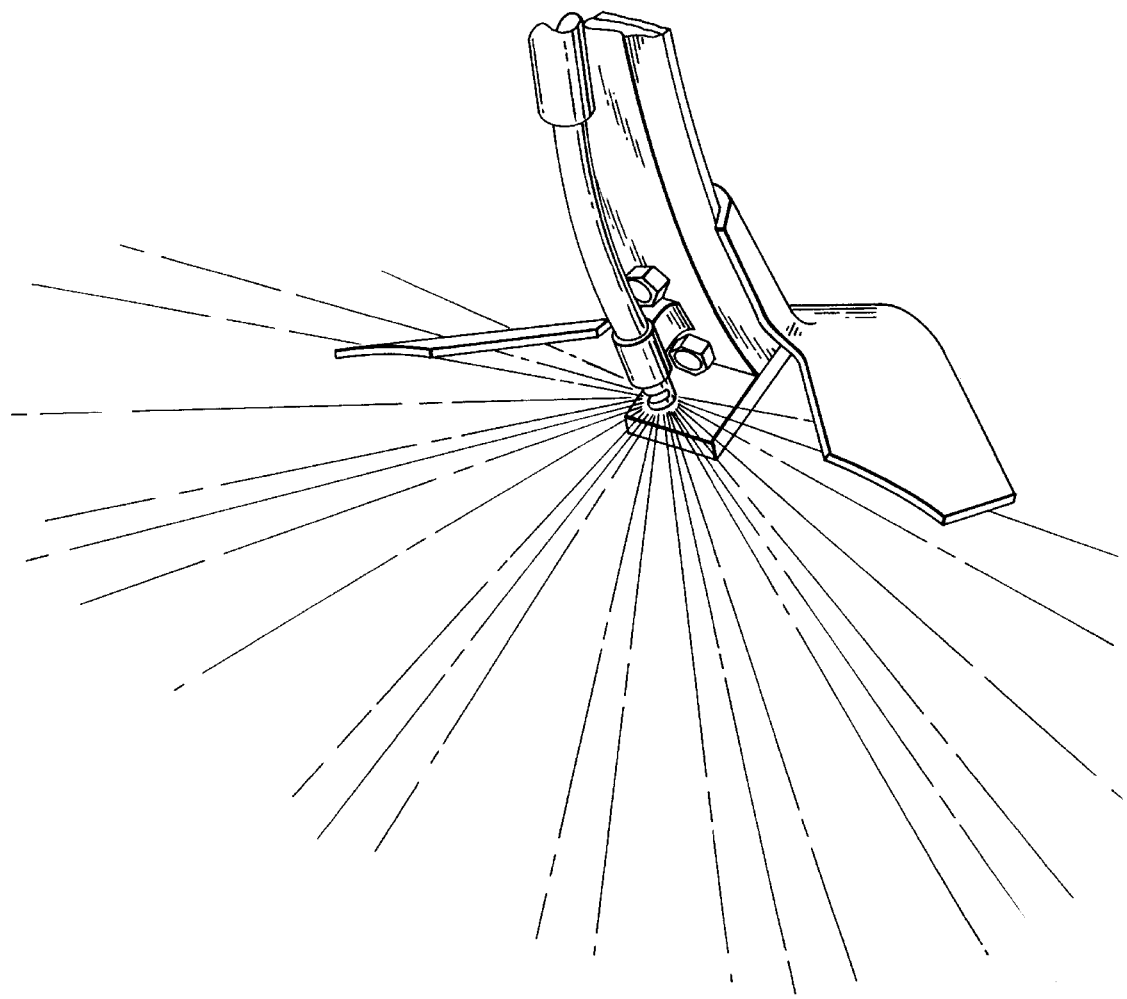
FIG. 5a is a perspective view of the rear of the plate and shank and the rearwardly discharging spray pattern from the wide angle flat spray nozzle.

With reference to FIG. 1, a plurality of plates 24 are provided, one shovel 24 being associated with each of the shanks 22. As shown in FIGS. 4 and 5, the plate 24 has a substantially V-shaped profile, resembling a swept wing. An included angle of 150 degrees has been used successfully. The plates 24 are preferably made of cast steel and have a wing span of approximately 12 inches across, as measured from wingtip to wingtip. Each plate 24 is mounted at the distal end 44 of a respective shank 22. The plates 24 are mounted at an angle of from 40 degrees to 50 degrees relative to the plane in which the plates 24 lie. Bolts 80 having a threaded end and nuts 82 received on the threaded end of the bolts 80 are preferably used for mounting the plates 24 to the shanks 22 so that the plates 24 may be easily removed for replacement or repair.

With further reference to FIGS. 4 and 5, a wide angle flat spray nozzle 84 is provided on the under side of each of the plates 24. Nozzles 84 are preferably stainless steel to provide strength as well as corrosion resistance, required by the caustic chemicals that may be used, as well as, the high soil moisture content. Suitable nozzles 84 may be obtained from Floodjet®, Catalogue No. 1/4 K-SS5, shown in FIGS. 4, 4a, 5, and 5a, which are nozzles that have a notch 98 designed to provide a wide deflector-type spray pattern. The nozzles 84 are wide angle flat spray nozzles having a round orifice (not shown) within the notch 98 to minimize clogging when the chemical is discharged from the orifice. The wide angle flat spray nozzles 84 are designed to generate 10–30 psi at normal working speeds of 4–6 mph, which would deliver 35–50 gallons per acre.

Figure 6:
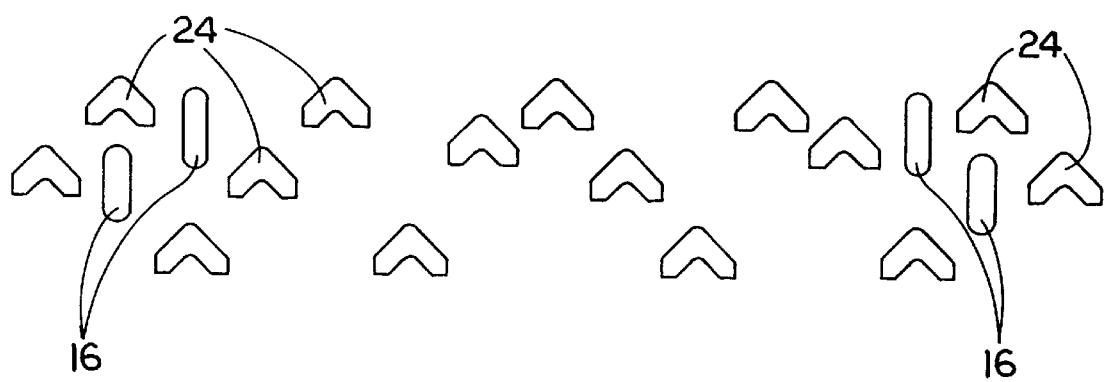
FIG. 6 is a top plane view of a preferred layout of the plates relative to each other and the wheels.

The orientation of the nozzle 84 with respect to the plate 24 is critical. The object is to obtain a wide deflector-type flat spray pattern over the trailing edge 86 of the plate 24, extending rearward therefrom and across the entire span of the plate 24 so that the chemical covers the entire cavity formed from the displacement of the soil in the subsurface layer by the plate. A spray pattern of 150 degrees has been used successfully. Achieving this spray pattern on the plurality of plates 24 which are arranged as discussed above and as shown in FIG. 6, permits an even application of fumigant in the soil layer in a wide horizontal band across the injection depth to avoid the possibility of having some soil untreated by the chemical applied.

With reference to FIG. 1, a storage tank or reservoir 18 is securely mounted to a second frame 20 which is connected between the tractor 14 and the first frame 12. The reservoir 18 is made of fiberglass or other inert substance so that various materials may be safely transported therein. The reservoir 18 is provided with an input port 90 for filing.

A means for communicating between the reservoir 18 and the nozzles 84 is provided on the apparatus 10. In the preferred embodiment the communicating means comprises a conventional pressurized fluid delivery system.

The pressurized fluid delivery system is comprises a conventional pump, filters (not shown) and delivery tubes 92 for delivering a pressurized flow of a liquid fumigant to the nozzles 84. The components of the delivery system, as well as the reservoir 18 and the nozzles 84 are built of inert materials, so that a variety of substances may be safely transported and delivered into the soil.

As best seen in FIGS. 1 and 3, a system of tubes lead from the reservoir 18 to the nozzles 84. One quarter inch polyhose may be used as the tubing 92. Clear or opaque tubing 92 is preferred so that movement of the substance within the individual tubes 92 may be viewed for detecting blockages.

A conventional pump (not shown) is provided, preferably one capable of a normal operating pressure of between 10 and 30 psi. The pump may be either hydraulic or ground driven from a conventional wheel driven system (not shown).

Alternatively, a conventional gravity flow system (not shown) may be used to implement the communicating means.

With reference to FIGS. 4 and 5, a rock shield 94 is mounted to each shank 22, beneath the underside of each plate 24 and its associated nozzle 84. Alternatively, the rock shield could be mounted to the plate 24 itself. The rock shields 94 are composed of a plate of mild steel, and may be welded to the bottom of the shank 22. The rock shields 94 do not prevent the nozzles from clogging but do provide protection to the individual nozzles 84 from damage due to contact with rocks and other debris located in the soil. Because wide angle flat spray nozzles 84 are utilized, the spray pattern is rearward, in a wide deflector-type flat spray pattern as opposed to a downward, stream-like pattern, thereby avoiding contact with the rock shield 94.

Additionally, a wear bar 96 may be provided on the front facing surface of the shank 22 extending up from the plate 24. The wear bar 96 is preferably composed of nylon or Teflon and is shaped to protect the front facing surface of the shank 22 from objects buried in the soil and from the constant wear associated with the movement of the shank 22 through the soil. The wear bars 96 may be mounted by locating one end thereof between the plate 24 and the shank 22 before tightening the bolts holding the plate 24 to the shank 22. In this way the wear bar 96 may be easily replaced when necessary.

In use, the above described apparatus 10 may be used to apply a subsurface layer of a substance to a field in preparation for planting. In one preferred method, the apparatus 10 is used to apply a fumigant such as metham sodium, available under tradenames such as: Vapam, Soil Prep, Methan, Butam and Nemasol, in an even layer between 5 and 12 inches below the soil's surface.

The apparatus 10 is hooked up to a tractor 14 or other device that will pull or push it across the field to be prepared.

The pump may be powered from a power takeoff, which is generally provided on tractors 14 and the like.

The storage tank or reservoir 18 may be filed with the fumigant mixture before or after the frame is mounted to the tractor 14, depending on which is the most convenient. The strength of the mixture is based on the crop type, the soil, the chemical, the results desired and a variety of other factors.

The either or both of the outrigger frames 26,27 may be pivoted to the engaged position depending on the width of the row to be prepared. Factors such as soil density, and the number and types of obstructions expected to be found in the soil should be factored into the decision, since the drag will increase if the outrigger frames 26,27 are deployed.

The apparatus 10 is the typically pulled, by the tractor 14, in a systematic pattern about the field. A single pass is sufficient to fumigate the row that the shovels 24 pass through. The plates 24 being mounted in a single horizontal plane, and the nozzles 84 at a fixed orientation to the respective plate 22 ensure that an even layer of fumigant is dispersed in a wide horizontal band of soil, 6 to 12 inches below the surface of the soil. The depth selected is contingent upon the targeted disease or pest for a particular crop. The fumigant is then permitted to migrate upward in the soil. The applicant's studies have shown that a fumigant such as Vapam will migrate upward in the soil, 6 to 8 inches depending on the soil conditions. This permits an even distribution of the fumigant throughout a discrete layer of soil while using only a single layer of plates 24.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principals of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the claims which follow.

We claim:

1. A metham sodium application apparatus for delivering metham sodium beneath a soil surface, the metham sodium stored in a reservoir, the apparatus comprising:

a frame;

at least one shank, the shank having a first end and a second end, the shank mounted proximate the first end thereof to the frame, the second end of the shank capable of being received beneath the soil surface;

a plate for each shank, the plate having a trailing edge and mounted on the second end of the shank substantially horizontal with respect to the soil surface, and the plate forming a subsurface cavity approximately the width of the plate as the plate moves through the soil, displacing the soil beneath the soil surface;

at least one wide angle flat spray nozzle for each of the plates for obtaining a wide deflector-type spray pattern mounted at the second end of the shank, behind the plate with respect to a direction of travel of the plate, the wide angle flat spray nozzle having an opening therein, the opening directed substantially rearward, to dispense the metham sodium into the subsurface cavity created by the plate;

a rock shield mounted to the shank, disposed below the wide angle flat spray nozzle relative to the soil surface; and means for communicating between the opening of the wide flat spray nozzle and the reservoir.

* * * * *